(12) United States Patent
Landais et al.

(10) Patent No.: US 11,509,728 B2
(45) Date of Patent: Nov. 22, 2022

(54) METHODS AND APPARATUSES FOR DISCOVERING A NETWORK FUNCTION ACTING AS NETWORK FUNCTION SERVICE CONSUMER

(71) Applicant: NOKIA SOLUTIONS AND NETWORKS OY, Espoo (FI)

(72) Inventors: Bruno Landais, Pleumeur-Bodou (FR); Thomas Belling, Erding (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/451,708

(22) Filed: Jun. 25, 2019

(65) Prior Publication Data

US 2020/0007632 A1 Jan. 2, 2020

Related U.S. Application Data

(60) Provisional application No. 62/692,153, filed on Jun. 29, 2018.

(51) Int. Cl.
| | | |
|---|---|---|
| *H04L 67/51* | (2022.01) | |
| *H04L 67/02* | (2022.01) | |
| *H04L 69/322* | (2022.01) | |
| *H04L 67/55* | (2022.01) | |
| *H04L 101/38* | (2022.01) | |

(52) U.S. Cl.
CPC .............. *H04L 67/51* (2022.05); *H04L 67/02* (2013.01); *H04L 67/55* (2022.05); *H04L 69/322* (2013.01); *H04L 2101/38* (2022.05)

(58) Field of Classification Search
CPC ....... H04L 67/16; H04L 61/308; H04L 67/02; H04L 67/26; H04L 69/322

USPC ......................................................... 709/217
See application file for complete search history.

(56) References Cited

U.S. PATENT DOCUMENTS

| | | | |
|---|---|---|---|
| 2003/0105801 A1* | 6/2003 | Tse ....................... | H04L 67/2814 |
| | | | 709/202 |
| 2017/0041181 A1* | 2/2017 | Achuthan ............... | G06F 9/542 |
| 2017/0303259 A1* | 10/2017 | Lee ......................... | H04W 12/08 |

(Continued)

OTHER PUBLICATIONS

3GPP TS 23.501 V15.2.0 (Jun. 2018), Technical Specification, 3rd Generation Partnership Project; Technical Specification Group Services and System Aspects; System Architecture for the 5G System; Stage 2 (Release 15), Jun. 19, 2018.

(Continued)

*Primary Examiner* — Hee Soo Kim
*Assistant Examiner* — Chong G Kim
(74) *Attorney, Agent, or Firm* — Squire Patton Boggs (US) LLP

(57) ABSTRACT

Systems, methods, apparatuses, and computer program products for discovering a network function (NF) acting as a network function service consumer are provided. One method may include, when a NF service consumer subscribes to notifications from a NF service producer, receiving, by the NF service producer, subscription information including a name of a consumer service of the NF service consumer that subscribes to notifications of the NF service producer. The receiving of the subscription information with the name of the consumer service allows the NF service producer to discover a corresponding NF service from an alternative NF instance within a NF set.

20 Claims, 5 Drawing Sheets

(56) References Cited

U.S. PATENT DOCUMENTS

| | | | | |
|---|---|---|---|---|
| 2019/0253894 | A1* | 8/2019 | Bykampadi | H04L 9/3247 |
| 2020/0178048 | A1* | 6/2020 | Kim | H04W 4/40 |
| 2020/0267214 | A1* | 8/2020 | Yang | H04L 67/1036 |
| 2020/0296571 | A1* | 9/2020 | Puente Pestana | H04L 67/16 |
| 2020/0296660 | A1* | 9/2020 | Wang | H04W 48/16 |
| 2021/0235244 | A1* | 7/2021 | Bartolome Rodrigo | H04W 4/50 |

OTHER PUBLICATIONS

3GPP TS 23.502 V15.2.0 (Jun. 2018), Technical Specification, 3rd Generation Partnership Project; Technical Specification Group Services and System Aspects; Procedures for the 5G System; Stage 2 (Release 15), Jun. 19, 2018.

3GPP TS 29.500 V15.0.0 (Jun. 2018), Technical Specification, 3rd Generation Partnership Project; Technical Specification Group Core Network and Terminals; 5G System; Technical Realization of Service Based Architecture Stage 3 (Release 15), Jun. 15, 2018.

3GPP TS 29.508 V15.0.0 (Jun. 2018), Technical Specification, 3rd Generation Partnership Project; Technical Specification Group Core Network and Terminals; 5G System; Session Management Event Exposure Service; Stage 3 (Release 15), Jun. 22, 2018.

3GPP TS 29.510 V15.0.0 (Jun. 2018), Technical Specification, 3rd Generation Partnership Project; Technical Specification Group Core Network and Terminals; 5G System; Network Function Repository Services; Stage 3 (Release 15), Jun. 15, 2018.

First Examination Report issued in corresponding Indian Patent Application No. 202117000714 dated Jan. 4, 2022.

\* cited by examiner

METHODS AND APPARATUSES FOR DISCOVERING A NETWORK FUNCTION ACTING AS NETWORK FUNCTION SERVICE CONSUMER

CROSS-REFERENCE TO RELATED APPLICATIONS

This application claims priority from U.S. provisional patent application No. 62/692,153 filed on Jun. 29, 2018. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to discovering a network function in such systems.

BACKGROUND

Examples of mobile or wireless telecommunication systems may include the Universal Mobile Telecommunications System (UNITS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment is directed to a method including, when a network function service consumer subscribes to notifications of a network function service producer, sending, to the network function service producer, subscription information including a name of a consumer service to allow the network function service producer to discover a corresponding network function service from an alternative network function instance within a network function set.

Another embodiment is directed to an apparatus including at least one processor and at least one memory comprising computer program code. The at least one memory and computer program code configured, with the at least one processor, to cause the apparatus at least to, when a network function service consumer subscribes to notifications of a network function service producer, send, to the network function service producer, subscription information including a name of a consumer service to allow the network function service producer to discover a corresponding network function service from an alternative network function instance within a network function set.

Another embodiment is directed to an apparatus including, when a network function service consumer subscribes to notifications of a network function service producer, means for sending, to the network function service producer, subscription information including a name of a consumer service to allow the network function service producer to discover a corresponding network function service from an alternative network function instance within a network function set.

Another embodiment is directed to a non-transitory computer readable medium comprising program instructions stored thereon for performing at least a method including, when a network function service consumer subscribes to notifications of a network function service producer, sending, to the network function service producer, subscription information including a name of a consumer service to allow the network function service producer to discover a corresponding network function service from an alternative network function instance within a network function set.

Another embodiment is directed to a method including, when a network function service consumer subscribes to notifications from a network function service producer, receiving, by the network function service producer, subscription information including a name of a consumer service of the network function service consumer that subscribes to notifications of the network function service producer. The receiving of the subscription information with the name of the consumer service allows the network function service producer to discover a corresponding network function service from an alternative network function instance within a network function set.

Another embodiment is directed to an apparatus including at least one processor and at least one memory comprising computer program code. The at least one memory and computer program code configured, with the at least one processor, to cause the apparatus at least to, when a network function service consumer subscribes to notifications from a network function service producer, receive subscription information including a name of a consumer service of the network function service consumer that subscribes to notifications of the network function service producer. The receiving of the subscription information with the name of the consumer service allows the network function service producer to discover a corresponding network function service from an alternative network function instance within a network function set.

Another embodiment is directed to an apparatus including, when a network function service consumer subscribes to notifications from a network function service producer, means for receiving, by the network function service producer, subscription information including a name of a consumer service of the network function service consumer that subscribes to notifications of the network function service producer. The receiving of the subscription information with the name of the consumer service allows the network function service producer to discover a corresponding network function service from an alternative network function instance within a network function set.

Another embodiment is directed to a non-transitory computer readable medium comprising program instructions stored thereon for performing at least a method including, when a network function service consumer subscribes to notifications from a network function service producer, receiving, by the network function service producer, subscription information including a name of a consumer service of the network function service consumer that subscribes to notifications of the network function service producer. The receiving of the subscription information with the name of the consumer service allows the network function service producer to discover a corresponding network function service from an alternative network function instance within a network function set.

BRIEF DESCRIPTION OF THE DRAWINGS

For proper understanding of example embodiments, reference should be made to the accompanying drawings, wherein.

DETAILED DESCRIPTION

Figure 1:
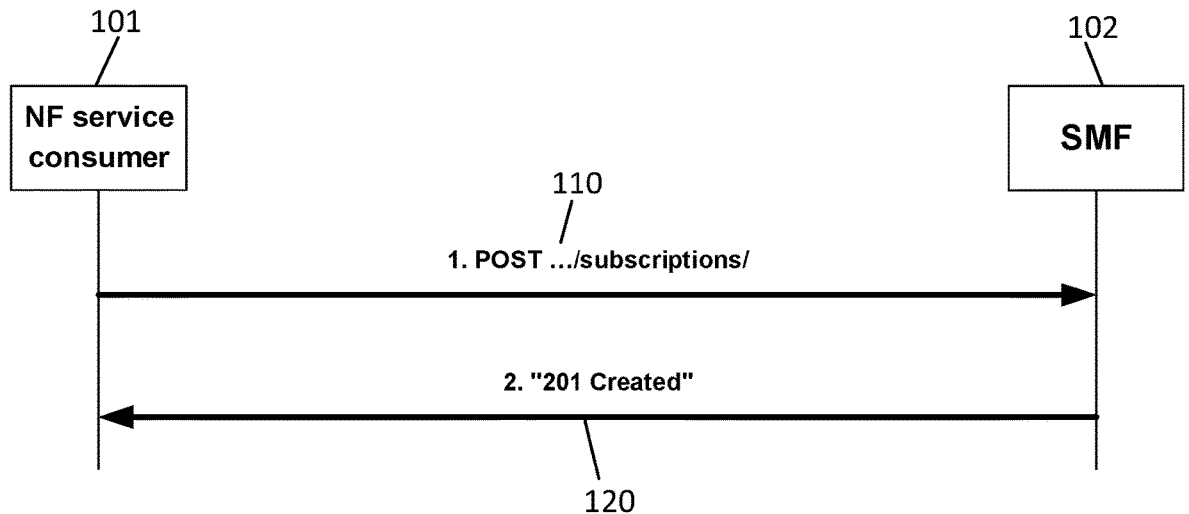
FIG. 1 illustrates an example signaling diagram, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for discovering a network function (NF) acting as a network function service consumer, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

According to third generation partnership project (3GPP) technical specification (TS) 23.501 and 3GPP TS 23.502, one or more access and mobility management functions (AMFs) can form an AMF set. A UE may be assigned to any AMF within the set, and the assignment can change while the UE is registered.

When an AMF is no longer reachable or no longer serves the UE, a peer may contact a network resource function (NRF) to discover other AMFs in the set or may use other AMFs in the set, as previously discovered from the NRF.

For stateless AMF support in the 5G core network (5GC), 3GPP TS 29.500 specifies that a NF Service Producer, such as a session management function (SMF) or unified data management (UDM), may find an alternative AMF acting as a NF Service Consumer within an AMF set using a NRF discovery service. This may be desirable, for example, when the NF Service Producer needs to send a notification to the AMF but the last known AMF is no longer available due to a scale-in operation or failure. There is, however, no procedure currently specified that allows a NF Service Producer to discover a NF (e.g., AMF) acting as a Service Consumer.

The NF Service Producer does not know the specific service of the NF Service Consumer that subscribes to a notification. NF Service Consumer implementations may be distributed and exhibit different address endpoints, e.g., an internet protocol (IP) address or uniform resource identifier (URI), for their services. Thus, the existing 3GPP procedures do not permit a NF Service Producer to discover the address endpoint of the specific service in the NF service consumer (e.g., AMF). Example embodiments described herein provide solutions for at least these problems.

According to certain embodiments, a NF Service Consumer (e.g., AMF) that subscribes to notifications of a NF Service Producer may be configured to provide the name of a consumer service, that the NF Service Consumer has previously registered at the NRF and that uses information obtained in said notifications, within the subscription information provided towards the NF Service Producer. This allows the NF Service Producer to discover the corresponding NF service from an alternative NF (e.g., AMF) instance within an NF Set (e.g., AMF Set) using the NRF discovery service. The name of the NF consumer service corresponds to the name of a service produced by the NF Service Consumer and registered in the NRF (e.g., having "Namf" as the first part of the name if the NF Service Consumer is an AMF), and/or to an NF consumer service that is registered by the NF Service Consumer in the NRF. This may be a specific service for the purpose of receiving said notifications or a service NF Service Consumer produces for other purposes.

In some embodiments, the NF Service Producer may be configured to perform a discovery of the NF Service Consumer (e.g., an AMF) providing a wildcard service name or not providing any service name at all. The NRF may then return the candidate NF (e.g. AMF) profiles with all the services they support. The NF Service Producer may use the address endpoints (IP addresses and port information or a Fully Qualified Domain Name) registered in the Consumer NF (e.g. AMF) Profile, at the NF level, in the NRF, as the destination endpoints for sending the notification. The NF Service Consumer may then forward, if necessary, the received notification to its specific service having subscribed to the notification. The Notification URI that the NF Service Consumer provides to the NF Service Producer when subscribing to the notification may contain some part after the authority part that can be used by the NF Service Consumer to identify the service having subscribed to the notification, to help the NF Service Consumer to identify the service towards which it needs to forward the notification received from the NF Service Producer.

FIG. 1 illustrates an example signaling diagram depicting how an embodiments may be applied to the session management event exposure function, according to one example. As illustrated in the example of FIG. 1, to subscribe to event notifications, at 110, the NF service consumer 101 may send an HTTP POST request to a SMF 102. The HTTP POST request may include: "{apiRoot}/nsmf-eventexposure/v1/subscriptions/" as Resource URI, and a Nsmf_EventExposure data structure as the request body.

In an embodiment, if the subscription applies to events related to a single protocol data unit (PDU) session, the request body may include the PDU Session identifier (ID) of that PDU session as "pduSeId" attribute.

According to an embodiment, if the subscription applies to events not related to a single PDU session, the request body may include an identification of UEs to which the subscription applies via, for example, identification of a single UE by subscription permanent identifier (SUPI) as "supi" attribute, identification of a group of UE(s) via a "groupId" attribute, or identification of any UE using a specific data network name (DNN) via the "dnn" attribute. It is noted that the identification of a UE does not apply for local breakout roaming scenarios where the SMF 102 is located in the visited public land mobile network (VPLMN) and the NF service consumer 101 is located in the home public land mobile network (HPLMN).

According to some embodiments, the request body may include, in addition to existing information (i.e., URI of where to receive the requested notifications as "notifURI" attribute, Notification Correlation Identifier assigned by the NF service consumer 101 for the requested notifications as "notifId" attribute, a description of the subscribed events as "eventSubs" attribute for each event, etc) the name of the service of the NF service consumer that subscribes to the notification.

According to certain embodiments, upon the reception of an HTTP POST request with "{apiRoot}/nsmf-eventexposure/v1/subscriptions/" as the resource URI and Nsmf_EventExposure data structure as the request body, the SMF 102 may be configured to: create a new subscription, assign a subscription correlation ID, store the subscription to include the name of the service of the NF Service Consumer that subscribes to the notification, send a HTTP "201 Created" response 120 with Nsmf_EventExposure data structure as request body that may include the assigned subscription correlation ID in the "subId" attribute, and/or query the NRF to discover the same consumer service from other members of the AMF set using the Nnrf_NFDiscovery Service (e.g., see 3GPP TS 29.510) providing the "AMF service" as service name and the AMF Set ID. It is noted that the SMF 102 may query the NRF immediately, when obtaining an HTTP "404 Not found" error response in response to a notification, or when becoming aware that a new NF service consumer is requiring notifications.

Figure 2:
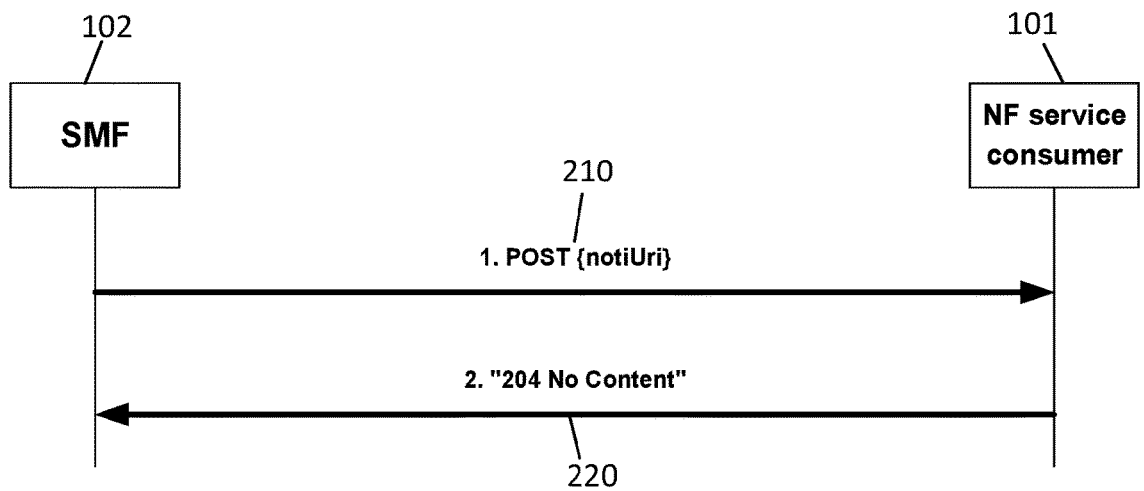
FIG. 2 illustrates an example signaling diagram, according to an embodiment.

FIG. 2 illustrates an example signaling diagram depicting a process for notification about subscribed events, according to one example. As illustrated in the example of FIG. 2, when the SMF 102 observes PDU Session related event(s) for which an NF service consumer 101 has subscribed to, the SMF 102 may send, at 210, an HTTP POST request with "{notifUri}" as previously provided by the NF service consumer 102 within the corresponding subscription as URI and Nsmf_EventExposure data structure as the request body. In an embodiment, the request body may include a notification correlation ID provided by the NF service consumer 101 during the subscription as "notifId" attribute and/or information about the observed event(s) within the "eventNotifs" attribute.

Upon the reception of the HTTP POST request with "{notifUri}" as URI and an Nsmf_EventExposure data structure as the request body, the NF service consumer 101 may send, at 220, a "204 No Content" HTTP response for a succesfull processing. If the SMF 102 becomes aware that a new NF service consumer is requiring notifications (e.g., via the "404 Not found" response, or via Namf Communication service AMFStatusChange Notifications, see 3GPP TS 23.502 [3], or via link level failures), the SMF 102 may use the Nnrf_NFDiscovery Service (using the AMF service name obtained during the creation of the subscription) to query the other AMFs within the AMF set and then exchange the authority part of the Notification URI with one of those addresses and may use that URI in subsequent communication. If the SMF 102 received a "404 Not found" response, the SMF 102 may resend the failed notification to that URI.

Figure 5:
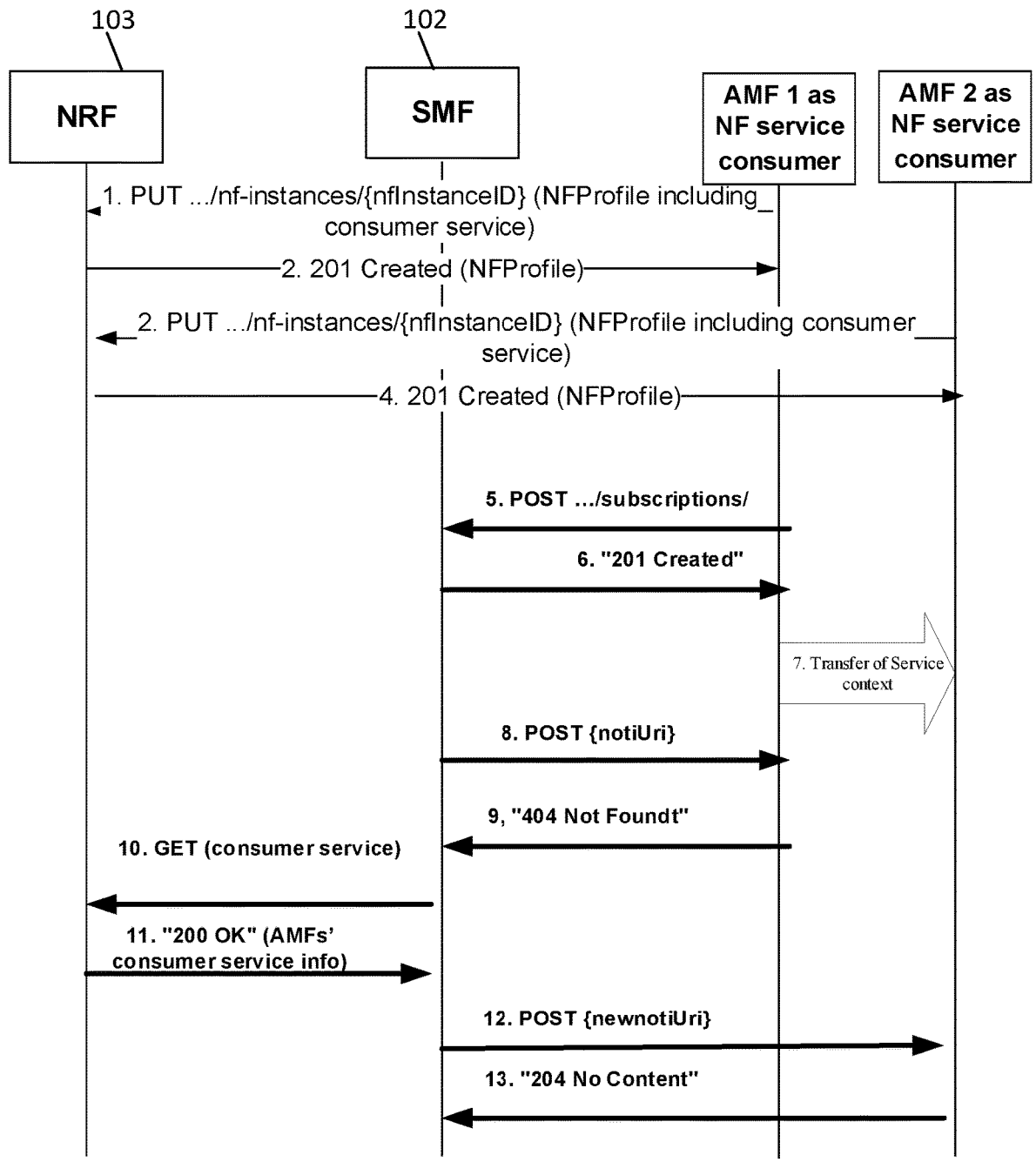
FIG. 5 illustrates an example signaling diagram, according to an embodiment.

FIG. 5 illustrates an example signaling diagram, according to certain embodiments. As illustrated in the example of FIG. 5, two AMF instances, AMF 1 and AMF 2, are in a set of AMFs that can serve an UE context. At steps 1 and 2, AMF 1 may start up and register a consumer service it provides at the NRF 103. At steps 3 and 4, AMF 2 may start up and register the same consumer service it provides at the NRF 103. At steps 5 and 6, similar to what is depicted in FIG. 1, AMF 1 may subscribe as service consumer to a service produced at the SMF 102. For example, AMF 1 may subscribe to notifications and provides an URL where it desires to receive notifications. It also may provide the name of the consumer service it registered at the NRF 103. At step 7, the service context to which the subscription in step 5 related may be transferred from AMF 1 to AMF 2. This may for instance be the context of information about a UE that was served by the AMF 1. The AMF 1 may also be switched off, could experience a failure or be rebooted. At steps 8-9, similar to what is depicted in FIG. 2, the SMF 102 may try to send a notification to the AMF 1. It may either obtain a failure response from that AMF 1 or may notice by other means such as link level failures or a missing response message that AMF 1 is not reachable. At steps 10 and 11, the SMF 102 may query the NRF 103 for other network functions that provide the consumer service it obtained in step 5. The NRF 103 may return the IP addresses of one or other NF functions that registered with that consumer service at the NRF 103, among them AMF 2. At steps 12 and 13, the SMF 102 may exchange the authority part of the notification URI it obtained in step 5 with the IP address of one of the NF functions obtained in step 11. It may send a notification to the new notification URI derived in that manner.

Per the current 3GPP TS 29.510, address endpoints can be registered per NF and/or per NF service. Default notifications may be registered per NF service, with the corresponding callback URI.

In an embodiment, the NF service consumer may register the address endpoint to use for notifications in its NFProfile at NF level. The NF service producer may use the address endpoint registered at the NF level in the NRF for sending notifications. The NF service consumer may forward, if necessary, the notification to its service having subscribed to the notification. Table 1 below depicts the definition of type NFProfile, Table 2 below depicts the definition of type NFService, and Table 3 below depicts the definition of type DefaultNotificationSubscription, per current 3GPP TS 29.510.

TABLE 1

| Attribute name | Data type | P | Cardinality | Description |
| --- | --- | --- | --- | --- |
| nfInstanceID | NfInstanceId | M | 1 | Unique identity of the NF Instance. |
| nfType | NFType | M | 1 | Type of Network Function |
| nfStatus | NFStatus | M | 1 | Status of the NF Instance |
| plmn | PlmnId | O | 0 . . . 1 | PLMN of the Network Function |
| sNssais | array(Snssai) | O | 0 . . . N | NSSAIs of the Network Function |
| nsiList | array(string) | O | 0 . . . 1 | NSI identities of the Network Function |
| fqdn | Fqdn | C | 0 . . . 1 | FQDN of the Network Function (NOTE 1, NOTE 2) |
| interPlmnFqdn | Fqdn | C | 0 . . . 1 | If the NF needs to be discoverable by other NFs in a different PLMN, then an FQDN that is used for inter PLMN routing as specified in 3GPP TS 23.003 [12] shall be registered with the NRF. |
| ipv4Addresses | array(Ipv4Addr) | C | 0 . . . N | IPv4 address(es) of the Network Function (NOTE 1, NOTE 2) |
| ipv6Addresses | array(Ipv6Addr) | C | 0 . . . N | IPv6 address(es) of the Network Function (NOTE 1, NOTE 2) |
| ipv6Prefixes | array(Ipv6Prefix) | C | 0 . . . N | IPv6 prefix of the Network Function (NOTE 1, NOTE 2) |
| capacity | integer | O | 0 . . . 1 | Static capacity information, expressed as a weight relative to other NF instances of the same type |
| load | integer | O | 0 . . . 1 | Dynamic load information, ranged from 0 to 100, indicates the current load percentage of the NF. |
| locality | string | O | 0 . . . 1 | Operator defined information about the location of the NF instance (e.g. geographic location, data center) (NOTE 3) |
| udrInfo | UdrInfo | O | 0 . . . 1 | Specific data for the UDR (ranges of SUPI, group ID . . . ) |
| udmInfo | UdmInfo | O | 0 . . . 1 | Specific data for the UDM (ranges of SUPI, group ID . . . ) |
| ausfInfo | AusfInfo | O | 0 . . . 1 | Specific data for the AUSF (ranges of SUPI, group ID . . . ) |
| amfInfo | AmfInfo | O | 0 . . . 1 | Specific data for the AMF (AMF Set ID, . . . ) |
| smfInfo | smfInfo | O | 0 . . . 1 | Specific data for the SMF (DNN's, . . . ) |
| upfInfo | UpfInfo | O | 0 . . . 1 | Specific data for the UPF (S-NSSAI, DNN, SMF serving area, interface . . . ) |
| pcfInfo | PcfInfo | O | 0 . . . 1 | Specific data for the PCF |
| bsfInfo | BsfInfo | O | 0 . . . 1 | Specific data for the BSF |
| nfServices | array(NFService) | O | 0 . . . N | List of NF Service Instances |

TABLE 2

| Attribute name | Data type | P | Cardinality | Description |
| --- | --- | --- | --- | --- |
| serviceInstanceID | string | M | 1 | Unique ID of the service instance within a given NF Instance |
| serviceNanne | string | M | 1 | Name of the service instance (e.g. "udm-sdm") |
| version | array(NFServiceVersion) | M | 1 . . . N | The API versions supported by the NF Service and if available, the corresponding retirement date of the NF Service. |
| schema | string | M | 1 | Protocol schema (e.g. "http", "https") |
| fqdn | string | O | 0 . . . 1 | FQDN of the NF where the service is hosted (see NOTE 1, NOTE 3) |
| ipEndPoints | array(IpEndPoint) | O | 0 . . . N | IP address(es) and port information of the Network |

TABLE 2-continued

| Attribute name | Data type | P | Cardinality | Description |
|---|---|---|---|---|
| | | | | Function (including IPv4 and/or IPv6 address) where the service is listening for incoming service requests (see NOTE 1) |
| apiPrefix | string | O | 0 . . . 1 | Optional path segment(s) used to construct the {apiRoot} variable of the different API URIs, as described in 3GPP TS 29.501 [3], subclause 4.4.1 (optional deployment-specific string that starts with a "/" character) |
| defaultNotificationSubscriptions | array(DefaultNotificationSubscription) | O | 0 . . . N | Notification endpoints for different notification types. |
| capacity | integer | O | 0 . . . 1 | Static capacity information, expressed as a weight relative to other services of the same type. (See NOTE 2) |
| load | integer | O | 0 . . . 1 | Latest known load information of the NF Service, ranged from 0 to 100 in percentage. (See NOTE 4) |
| priority | integer | O | 0 . . . 1 | Priority (relative to other services of the same type), to be used for NF/Service selection; lower values indicate a higher priority. (See NOTE 2) |
| supportedFeatures | SupportedFeatures | O | 0 . . . 1 | Supported Features of the NF Service instance |

TABLE 3

| Attribute name | Data type | P | Cardinality | Description |
|---|---|---|---|---|
| notificationType | NotificationType | M | 1 | Type of notification for which the corresponding callback URI is provided. |
| callbackUri | Uri | M | 1 | The callback URI. |
| n1MessageClass | N1MessageClass | C | 0 . . . 1 | If the notification type is N1_MESSAGES, this IE shall be present and shall identify the class of N1 messages to be notified. |
| n2InformationClass | N2InformationClass | C | 0 . . . 1 | If the notification type is N2_INFORMATION, this IE shall be present and shall identify the class of N2 information to be notified. |

Figure 3A:
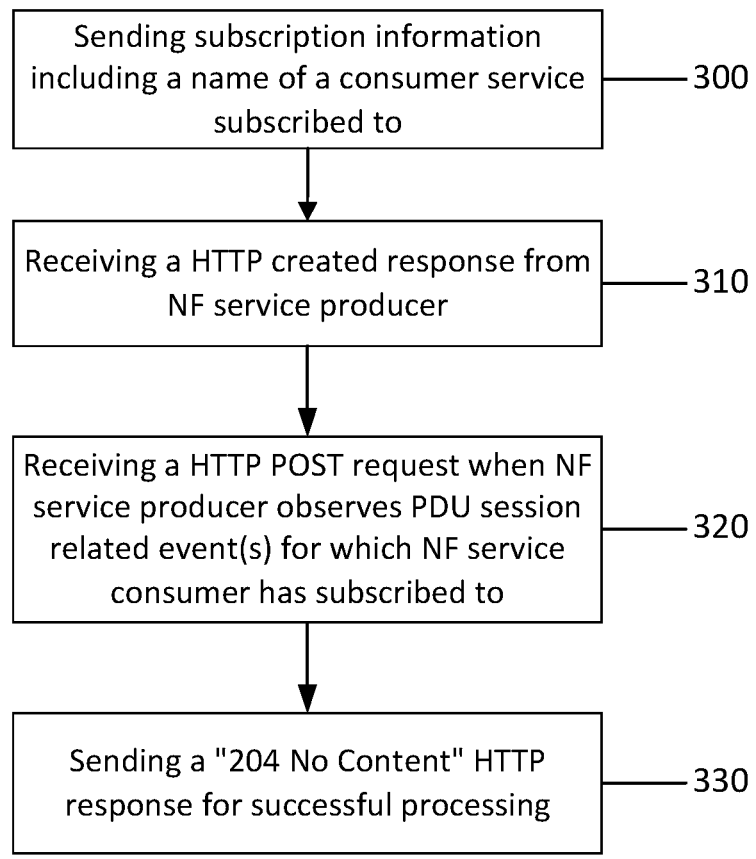
FIG. 3a illustrates an example flow diagram of a method, according to an embodiment.

FIG. 3a illustrates an example flow diagram of a method for discovering a NF acting as a NF service consumer, according to one example embodiment. In certain example embodiments, the flow diagram of FIG. 3a may be performed by a network entity or network node in a 3GPP system, such as LTE or 5G NR. For instance, in some example embodiments, the method of FIG. 3a may be performed by a NF service consumer entity, such as an AMF, as depicted in the example of FIG. 1 or FIG. 2. According to an embodiment, the NF service consumer may subscribe to notifications of a NF service producer, such as a SMF.

In one embodiment, the method of FIG. 3a may include, at 300, sending subscription information including a name of a consumer service to the NF service producer. The sending of the subscription information with the name of the consumer service allows the NF service producer to discover a corresponding NF service from an alternative NF instance within a NF set. According to some embodiments, the sending 300 of the subscription information may include transmitting a HTTP POST request to the NF service producer. In one example, the HTTP POST request may include: "{apiRoot}/nsmf-eventexposure/v1/subscriptions/" as resource URI, and a Nsmf_EventExposure data structure as the request body.

According to an embodiment, if the subscription applies to events not related to a single PDU session, the request body may include an identification of UEs to which the subscription applies via, for example, identification of a single UE by subscription permanent identifier (SUPI) as "supi" attribute, identification of a group of UE(s) via a "groupId" attribute, or identification of any UE using a specific data network name (DNN) via the "dnn" attribute. According to some embodiments, the request body may include in addition to existing information (URI of where to receive the requested notifications as "notifURI" attribute, a Notification Correlation Identifier assigned by the NF service consumer for the requested notifications as "notifId" attribute, a description of the subscribed events as "eventSubs" attribute for each event, etc), the name of the service of the NF service consumer that subscribes to the notification, as discussed above.

In certain embodiments, the method of FIG. 3a may further include, at 310, receiving a HTTP created response from the NF service producer. According to one embodiment, the HTTP created response may be a HTTP "201 Created" response with Nsmf_EventExposure data structure as the request body that may include the assigned subscription correlation ID, for example, in the "subId" attribute.

According to an embodiment, when the NF service producer observes PDU session related event(s) for which an NF service consumer has subscribed to, the method may include, at 320, receiving a HTTP POST request with "{notifUri}" as previously provided by the NF service consumer within the corresponding subscription as URI and Nsmf_EventExposure data structure as the request body. In an embodiment, the request body may include a notification correlation ID provided by the NF service consumer during the subscription as "notifId" attribute and/or information about the observed event(s) within the "eventNotifs" attribute. Upon receiving the HTTP POST request with "{notifUri}" as URI and an Nsmf_EventExposure data structure as the request body, the method may include, at 330, sending a "204 No Content" HTTP response for successful processing.

Figure 3B:
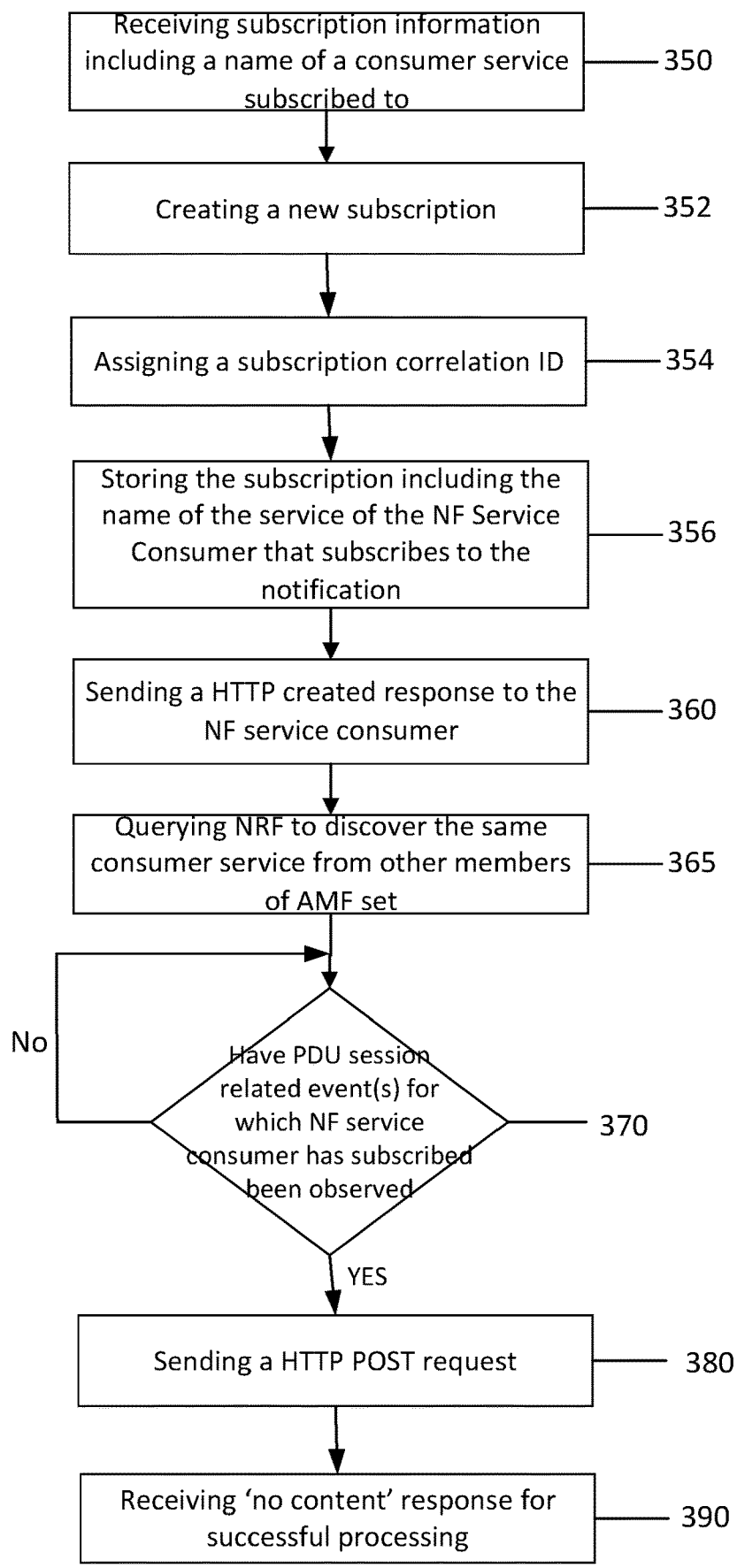
FIG. 3b illustrates an example flow diagram of a method, according to an embodiment.

FIG. 3b illustrates an example flow diagram of a method for discovering a NF acting as a NF service consumer, according to an example embodiment. In certain example embodiments, the flow diagram of FIG. 3b may be performed by a network entity or network node in a 3GPP system, such as LTE or 5G NR. For instance, in some example embodiments, the method of FIG. 3b may be performed by a NF service producer entity, such as a SMF, as depicted in the example of FIG. 1 or FIG. 2.

In one embodiment, the method of FIG. 3b may include, at 350, receiving subscription information including a name of a consumer service of a NF service consumer that subscribes to notifications of the NF service producer. The receiving of the subscription information with the name of the consumer service allows the NF service producer to discover a corresponding NF service from an alternative NF instance within a NF set. According to some embodiments, the receiving 350 of the subscription information may include receiving a HTTP POST request from the NF service consumer. In one example, the HTTP POST request may include: "{apiRoot}/nsmf-eventexposure/v1/subscriptions/" as resource URI, and a Nsmf_EventExposure data structure as the request body.

According to an embodiment, if the subscription applies to events not related to a single PDU session, the request body may include an identification of UEs to which the subscription applies via, for example, identification of a single UE by subscription permanent identifier (SUPI) as "supi" attribute, identification of a group of UE(s) via a "groupId" attribute, or identification of any UE using a specific data network name (DNN) via the "dnn" attribute. According to some embodiments, the request body may also include one or more of: an URI of where to receive the requested notifications as "notifURI" attribute, a Notification Correlation Identifier assigned by the NF service consumer for the requested notifications as "notifId" attribute, a description of the subscribed events as "eventSubs" attribute for each event, and/or the name of the service of the NF service consumer that subscribes to the notification, as discussed above.

According to an embodiment, the method may also include, at 352, creating a new subscription, at 354, assigning a subscription correlation ID, and, at 356, storing the subscription including the name of the service of the NF Service Consumer that subscribes to the notification.

In certain embodiments, the method of FIG. 3b may further include, at 360, sending a HTTP created response to the NF service consumer. According to one embodiment, the HTTP created response may be a HTTP "201 Created" response with Nsmf_EventExposure data structure as the request body that may include the assigned subscription correlation ID, for example, in the "subId" attribute. In an embodiment, the method may also include, at 365, querying the NRF to discover the same consumer service from other members of the AMF set, for example, using the Nnrf_NF-Discovery Service providing the "AMF service" as service name and the AMF set ID. According to some embodiments, the querying 365 may include querying the NRF immediately or when obtaining an HTTP "404 Not found" error response, in response to a notification of when becoming aware that a new NF service consumer is requiring notifications.

According to an embodiment, the method may also include, at 370, checking whether PDU session related event(s) for which an NF service consumer has subscribed have been observed. When the NF service producer does observe PDU session related event(s) for which an NF service consumer has subscribed to, the method may include, at 380, sending a HTTP POST request with "{notifUri}" as previously provided by the NF service consumer within the corresponding subscription as URI and Nsmf_EventExposure data structure as the request body. In an embodiment, the request body may include a notification correlation ID provided by the NF service consumer during the subscription as "notifId" attribute and/or information about the observed event(s) within the "eventNotifs" attribute. In some embodiments, the method may also include, at 390, receiving a "204 No Content" HTTP response for successful processing from the NF service consumer.

Another embodiment of a method for discovering a NF acting as a service consumer may include the NF service consumer registering the address endpoint to use for notifications in its NFProfile at the NF level. The NF service consumer may forward, if necessary, the notification to its service having subscribed to the notification.

In yet another embodiment, a method may include performing, by a NF service producer, a discovery of the NF service consumer, and using the address endpoint registered at the NF level in the NRF for sending notifications.

Figure 4A:
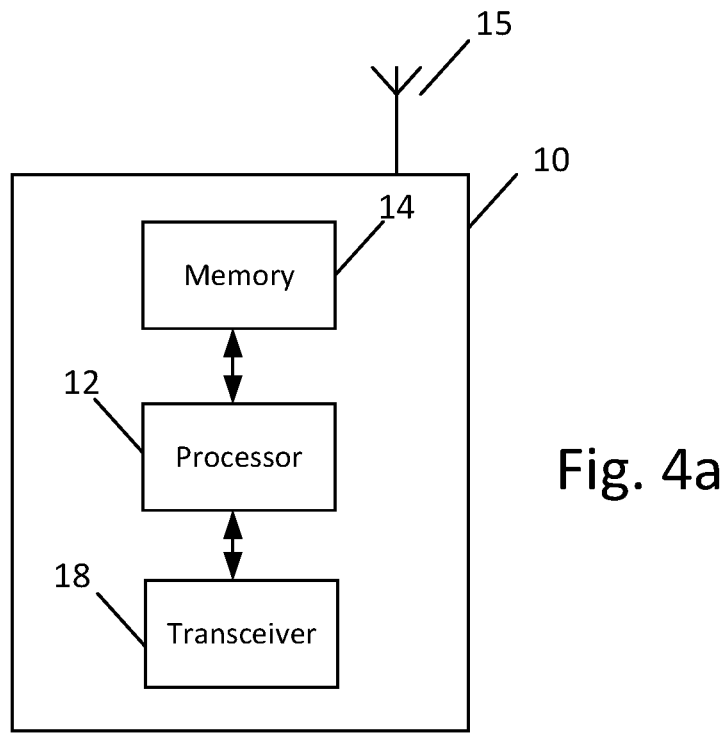
FIG. 4a illustrates an example block diagram of an apparatus, according to an embodiment.

FIG. 4a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), CU of a gNB, WLAN access point, serving gateway (SGW), mobility management entity (MME), a NF service consumer, or AMF, associated with a radio access network, such as a GSM network, LTE network, 5G or NR, a NF service Producer, SMF.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a NF service consumer or AMF, or the like. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as the signaling diagram illustrated in FIG. 1 or 2, or the flow chart of FIG. 3a. For instance, in some examples, apparatus 10 may correspond to or represent NF service consumer 101 of FIG. 1 or 2. In certain embodiments, apparatus 10 may be configured to perform a procedure for discovering a NF.

In one embodiment, apparatus 10 may be controlled by memory 14 and processor 12 to send subscription information including a name of a consumer service to the NF service producer. The sending of the subscription information with the name of the consumer service allows the NF service producer to discover a corresponding NF service from an alternative NF instance within a NF set. According to some embodiments, apparatus 10 may be controlled by memory 14 and processor 12 to send a HTTP POST request to the NF service producer. In one example, the HTTP POST request may include: "{apiRoot}/nsmf-eventexposure/v1/subscriptions/" as resource URI, and a Nsmf_EventExposure data structure as the request body.

According to an embodiment, if the subscription applies to events not related to a single PDU session, the request body may include an identification of UEs to which the subscription applies via, for example, identification of a single UE by subscription permanent identifier (SUPI) as "supi" attribute, identification of a group of UE(s) via a "groupId" attribute, or identification of any UE using a specific data network name (DNN) via the "dnn" attribute. According to some embodiments, the request body may also include one or more of: an URI of where to receive the requested notifications as "notifURI" attribute, a Notification Correlation Identifier assigned by the apparatus 10 for the requested notifications as "notifId" attribute, a description of the subscribed events as "eventSubs" attribute for each event, and/or the name of the service of the apparatus 10 that subscribes to the notification, as discussed above.

In certain embodiments, apparatus 10 may be controlled by memory 14 and processor 12 to receive a HTTP created response from the NF service producer. According to one embodiment, the HTTP created response may be a HTTP "201 Created" response with Nsmf_EventExposure data structure as the request body that may include the assigned subscription correlation ID, for example, in the "subId" attribute.

According to an embodiment, when the NF service producer observes PDU session related event(s) for which an NF service consumer has subscribed to, apparatus 10 may be controlled by memory 14 and processor 12 to receive a HTTP POST request with "{notifUri}" as previously provided by the apparatus 10 within the corresponding subscription as URI and Nsmf_EventExposure data structure as the request body. In an embodiment, the request body may include a notification correlation ID provided by the apparatus 10 during the subscription as "notifId" attribute and/or information about the observed event(s) within the "eventNotifs" attribute. Upon receiving the HTTP POST request with "{notifUri}" as URI and an Nsmf_EventExposure data structure as the request body, apparatus 10 may be controlled by memory 14 and processor 12 to send a "204 No Content" HTTP response for succesfull processing.

Figure 4B:
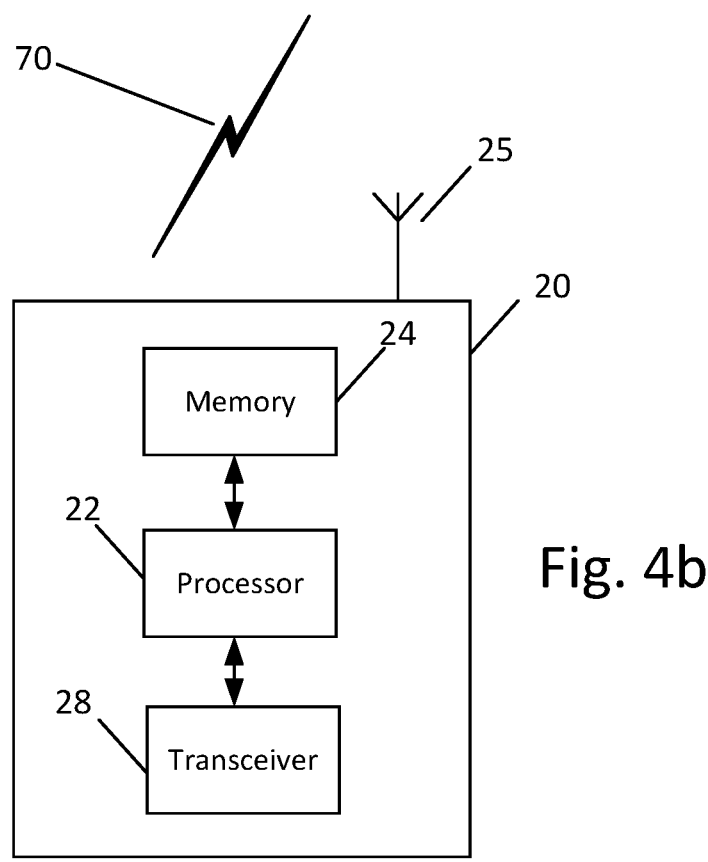
FIG. 4b illustrates an example block diagram of an apparatus, according to an embodiment.

FIG. 4b illustrates an example of an apparatus 20 according to another example embodiment. In example embodiments, apparatus 20 may be a node or server associated with a radio access network, such as a LTE network, 5G or NR or other radio systems which might benefit from an equivalent procedure. For example, in certain embodiments, apparatus 20 may include a NF service producer or SMF.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, in one example embodiment, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 10 may include an input and/or output device (I/O device). In certain examples, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR. For instance, in an example embodiment, link 70 may represent the Xn interface.

According to some example embodiments, processor 22 and memory 24 may be included in or may form a part of processing circuitry or control circuitry. In addition, in some example embodiments, transceiver 28 may be included in or may form a part of transceiving circuitry.

As discussed above, according to example embodiments, apparatus 20 may be a network node or functions, such as a NF service producer or SMF. According to certain examples, apparatus 20 may be controlled by memory 24 and processor 22 to perform the functions associated with example embodiments described herein. For instance, in some example embodiments, apparatus 20 may be configured to perform one or more of the processes depicted in any of the diagrams or signaling flow diagrams described herein, such as those illustrated in FIG. 1, FIG. 2, or FIG. 3*b*. As an example, apparatus 20 may correspond to SMF illustrated in FIG. 1 or 2. In example embodiments, apparatus 20 may be configured to perform a procedure for discovering a NF.

According to certain embodiments, apparatus 20 may be controlled by memory 24 and processor 22 to receive subscription information including a name of a consumer service of a NF service consumer that subscribes to notifications of the apparatus 20. The receiving of the subscription information with the name of the consumer service may allow the apparatus 20 to discover a corresponding NF service from an alternative NF instance within a NF set. According to some embodiments, apparatus 20 may be controlled by memory 24 and processor 22 to receive a HTTP POST request from the NF service consumer. In one example, the HTTP POST request may include: "{apiRoot}/nsmf-eventexposure/v1/subscriptions/" as resource URI, and a Nsmf_EventExposure data structure as the request body.

According to an embodiment, if the subscription applies to events not related to a single PDU session, the request body may include an identification of UEs to which the subscription applies via, for example, identification of a single UE by subscription permanent identifier (SUPI) as "supi" attribute, identification of a group of UE(s) via a "groupId" attribute, or identification of any UE using a specific data network name (DNN) via the "dnn" attribute. According to some embodiments, the request body may also include one or more of: an URI of where to receive the requested notifications as "notifURI" attribute, a Notification Correlation Identifier assigned by the NF service consumer for the requested notifications as "notifId" attribute, a description of the subscribed events as "eventSubs" attribute for each event, and/or the name of the service of the NF service consumer that subscribes to the notification, as discussed above.

According to an embodiment, apparatus 20 may be controlled by memory 24 and processor 22 to create a new subscription, assign a subscription correlation ID, and store the subscription including the name of the service of the NF Service Consumer that subscribes to the notification.

In certain embodiments, apparatus 20 may be controlled by memory 24 and processor 22 to send a HTTP created response to the NF service consumer. According to one embodiment, the HTTP created response may be a HTTP "201 Created" response with Nsmf_EventExposure data structure as the request body that may include the assigned subscription correlation ID, for example, in the "subId" attribute. In an embodiment, apparatus 20 may be controlled by memory 24 and processor 22 to query the NRF to discover the same consumer service from other members of the AMF set, for example, using the Nnrf_NFDiscovery Service providing the "AMF service" as service name and the AMF set ID. According to some embodiments, apparatus 20 may be controlled by memory 24 and processor 22 to query the NRF immediately or when obtaining an HTTP "404 Not found" error response, in response to a notification of when becoming aware that a new NF service consumer is requiring notifications.

According to an embodiment, apparatus 20 may be controlled by memory 24 and processor 22 to check whether PDU session related event(s) for which an NF service consumer has subscribed have been observed. When the apparatus 20 observes PDU session related event(s) for which an NF service consumer has subscribed to, apparatus 20 may be controlled by memory 24 and processor 22 to send a HTTP POST request with "{notifUri}" as previously provided by the NF service consumer within the corresponding subscription as URI and Nsmf_EventExposure data structure as the request body. In an embodiment, the request body may include a notification correlation ID provided by the NF service consumer during the subscription as "notifId" attribute and/or information about the observed event(s) within the "eventNotifs" attribute. In some embodiments, apparatus 20 may be controlled by memory 24 and processor 22 to receive a "204 No Content" HTTP response for succesfull processing from the NF service consumer.

Therefore, certain example embodiments provide several technical improvements, enhancements, and/or advantages. For example, certain embodiments allow for the discovery of a NF (e.g., AMF) acting as a service consumer and/or to allow a NF service producer to discover the address endpoint of the specific service in the NF service consumer. As such, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One embodiment may be directed to a method that may include sending to a NF service producer, by a NF service consumer that subscribes to notifications of the NF service producer, subscription information comprising a name of a service of the NF service consumer that subscribes to the notification.

Another embodiment may be directed to an apparatus that may include at least one processor and at least one memory comprising computer program code. The at least one memory and computer program code may be configured, with the at least one processor, to cause the apparatus at least to send, to a NF service producer, subscription information comprising a name of a service of the apparatus that subscribes to notifications of the NF service producer.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

We claim:

1. A method, comprising:
when a network function service consumer subscribes to notifications of a network function service producer, sending, to the network function service producer, subscription information including a name of a consumer service to allow the network function service producer to discover a corresponding network function service from an alternative network function instance within a network function set, wherein the name of the network function consumer service comprises the name of a service produced by the network function service consumer to receive the notifications and that is registered in a network resource function; and
receiving a HTTP created response from the network function service producer, wherein the HTTP created response comprises Nsmf_EventExposure data structure as the request body including an assigned subscription correlation identifier.

2. The method according to claim 1, wherein the sending of the subscription information further comprises transmitting a HTTP POST request to the network function service producer.

3. The method according to claim 1, wherein, when the subscription applies to events not related to a single protocol data unit (PDU) session, a request body of the subscription information comprises an identification of one or more user equipment (UEs) to which the subscription applies.

4. The method according to claim 3, wherein the request body further comprises at least one of a uniform resource identifier of where to receive the notifications, a notification correlation identifier assigned by the network function service consumer for the notifications, a description of the subscribed events, and the name of the service of the network function service consumer that subscribes to the notification.

5. The method according to claim 1, wherein, when the network function service producer observes one or more protocol data unit (PDU) session related events for which the network function service consumer has subscribed to, the method includes receiving a HTTP POST request with the uniform resource identifier and Nsmf_EventExposure data structure as the request body.

6. An apparatus, comprising:
at least one processor; and
at least one memory comprising computer program code, the at least one memory and computer program code configured, with the at least one processor, to cause the apparatus at least to
when a network function service consumer subscribes to notifications of a network function service producer, send, to the network function service producer, subscription information including a name of a consumer service to allow the network function service producer to discover a corresponding network function service from an alternative network function instance within a network function set, wherein the name of the network function consumer service comprises the name of a service produced by the network function service consumer to receive the notifications and that is registered in a network resource function; and
receive a HTTP created response from the network function service producer, wherein the HTTP created response comprises Nsmf_EventExposure data structure as the request body including an assigned subscription correlation identifier.

7. The apparatus according to claim 6, wherein the sending of the subscription information further comprises transmitting a HTTP POST request to the network function service producer.

8. The apparatus according to claim 6, wherein, when the subscription applies to events not related to a single protocol data unit (PDU) session, a request body of the subscription information comprises an identification of one or more user equipment (UEs) to which the subscription applies.

9. The apparatus according to claim 8, wherein the request body further comprises at least one of a uniform resource identifier of where to receive the notifications, a notification correlation identifier assigned by the network function service consumer for the notifications, a description of the subscribed events, and the name of the service of the network function service consumer that subscribes to the notification.

10. The apparatus according to claim 6, wherein, when the network function service producer observes one or more protocol data unit (PDU) session related events for which the network function service consumer has subscribed to, the at least one memory and computer program code are configured, with the at least one processor, to cause the apparatus at least to receive a HTTP POST request with the uniform resource identifier and Nsmf_EventExposure data structure as the request body.

11. A method, comprising:
when a network function service consumer subscribes to notifications from a network function service producer, receiving, by the network function service producer, subscription information including a name of a consumer service of the network function service consumer that subscribes to notifications of the network function service producer;
discovering, based on the receiving of the subscription information with the name of the consumer service, a corresponding network function service from an alternative network function instance within a network function set, wherein the name of the consumer service comprises the name of a service produced by the network function service consumer to receive the notifications and that is registered in a network resource function; and
sending, by the network function service producer, a HTTP created response, wherein the HTTP created response comprises Nsmf_EventExposure data structure as the request body including an assigned subscription correlation identifier.

12. The method according to claim 11, further comprising registering an address endpoint to use for the notifications at a network function level in a network function profile of the network function service producer.

13. The method according to claim 11, further comprising performing, by the network function service producer, a discovery of the network function service consumer, and using the address endpoint registered at the network function level in the network resource function for sending the notifications.

14. The method according to claim 11, further comprising:
creating a new subscription;
assigning the subscription correlation identifier; and
storing the subscription including the name of the service of the network function service consumer that subscribes to the notifications.

15. The method according to claim 11, further comprising querying the network resource function to discover the same consumer service from other members of the network function set using the Nnrf_NFDiscovery service.

16. An apparatus, comprising:
at least one processor; and
at least one memory comprising computer program code, wherein the apparatus comprises a network function service producer,
the at least one memory and computer program code configured, with the at least one processor, to cause the apparatus at least to
when a network function service consumer subscribes to notifications from the network function service producer, receive subscription information including a name of a consumer service of the network function service consumer that subscribes to notifications of the network function service producer;

discover, based on the receiving of the subscription information with the name of the consumer service, a corresponding network function service from an alternative network function instance within a network function set, wherein the name of the consumer service comprises the name of a service produced by the network function service consumer to receive the notifications and that is registered in a network resource function; and send, by the network function service producer, a HTTP created response, wherein the HTTP created response comprises Nsmf_EventExposure data structure as the request body including an assigned subscription correlation identifier.

17. The apparatus according to claim 16, wherein the at least one memory and computer program code are configured, with the at least one processor, to cause the apparatus at least to register an address endpoint to use for the notifications at a network function level in a network function profile of the network function service producer.

18. The apparatus according to claim 16, wherein the at least one memory and computer program code are configured, with the at least one processor, to cause the apparatus at least to perform a discovery of the network function service consumer, and to use the address endpoint registered at the network function level in the network resource function for sending the notifications.

19. The apparatus according to claim 16, wherein the at least one memory and computer program code are configured, with the at least one processor, to cause the apparatus at least to:

create a new subscription;

assign the subscription correlation identifier; and store the subscription including the name of the service of the network function service consumer that subscribes to the notifications.

20. The apparatus according to claim 16, wherein the at least one memory and computer program code are configured, with the at least one processor, to cause the apparatus at least to query the network resource function to discover the same consumer service from other members of the network function set using the Nnrf_NFDiscovery service.

* * * * *